United States Patent [19]

Köhler et al.

[11] Patent Number: 5,929,197
[45] Date of Patent: Jul. 27, 1999

[54] ACYLSUCCINIC ACID POLYESTERS, A PROCESS FOR THEIR PREPARATION AND THEIR USE IN THERMOSETTING PLASTICS AND COATINGS

[75] Inventors: Burkhard Köhler; Rolf-Volker Meyer, both of Leverkusen, Germany

[73] Assignee: Bayer Aktiengesellschaft, Leverkusen, Germany

[21] Appl. No.: 08/888,871

[22] Filed: Jul. 7, 1997

[30] Foreign Application Priority Data

Jul. 11, 1996 [DE] Germany ............................ 196 27 903

[51] Int. Cl.$^6$ .......................... C08G 63/91; C08G 14/12; C08L 67/00; C08L 75/06
[52] U.S. Cl. .......................... 528/274; 528/232; 523/500; 525/399
[58] Field of Search ................... 528/274, 232; 523/500; 525/399

[56] References Cited

U.S. PATENT DOCUMENTS

| 4,097,467 | 6/1978 | Roskett et al. ........................... 528/274 |
| 4,959,451 | 9/1990 | Uchida et al. ........................... 528/272 |
| 5,516,820 | 5/1996 | Babjak et al. ........................... 523/500 |

OTHER PUBLICATIONS

JOC 17 (1952) 1009 et seq, "The free radical addition of aldehydes to unsaturated polycarboxylic esters", T.M Patrick.

*Primary Examiner*—Tae Yoon
*Attorney, Agent, or Firm*—Joseph C. Gil; Diderico van Eyl; Thomas W. Roy

[57] ABSTRACT

The present invention relates to a process for preparing acylsuccinic acid polyesters by reacting A) a polyester, which is the reaction product o
  i) maleic acid, maleic acid esters, maleic anhydride, fumaric acid and/or fumaric acid esters and optionally other diacids, monoacids or their derivatives with
  ii) diols and optionally monofunctional alcohols,
  wherein the molar ratio of diols to diacids and their derivatives is 0.667:1 to 1.5:1, and the molar ratio of maleic acid and its derivatives+ fumaric acid and its derivatives to other diacids and their derivatives is greater than 0.15:1, and the molar ratio of monofunctional compounds to difunctional compounds is less than 0.4:1, with B) aliphatic $C_2$–$C_{22}$ aldehydes and/or cycloaliphatic $C_6$–$C_{20}$ aldehydes, in the presence of 0.2 to 10 % by weight (based on the weight of polyester) of free radical initiators at a temperature of 60 to 160° C. and a pressure of 1 to 20 bar wherein the molar ratio of aldehydes to maleic acid ester and fumaric acid ester units is 1:1 to 50:1, and distilling off excess aldehyde.

The present invention also relates to the acylsuccinic acid polyesters prepared by this process and to their use for the production of thermosetting plastics by reaction with di- or polyisocyanates such that 0.5 to 2 equivalents of isocyanate groups are used for each equivalent of acylsuccinic acid ester units.

12 Claims, No Drawings

ACYLSUCCINIC ACID POLYESTERS, A PROCESS FOR THEIR PREPARATION AND THEIR USE IN THERMOSETTING PLASTICS AND COATINGS

BACKGROUND OF THE INVENTION

1. Field of the Invention

The present invention relates to new polyesters of aliphatic acylsuccinic acids, to a process for their preparation by a free radical mechanism and to their use for the production of thermosetting plastic and coating compositions.

2. Description of the Prior Art

Acylsuccinic acid has a tendency towards decarboxylation, so that direct esterification to form polyesters is not possible.

It is known that maleic acid esters or fumaric acid esters can be reacted with aliphatic aldehydes in the presence of free radical initiators to form monomeric acylsuccinic acid esters JOC 17 (1952) 1009 et seq. Oligomerization occurs to a minor extent during the reaction. Therefore, it was expected that crosslinking would occur during the corresponding reaction of unsaturated polyesters.

It has now been found that acylsuccinic acid polyesters, which can be crosslinked with polyisocyanates to form crosslinked coatings, can be produced by the reaction of unsaturated polyesters with aliphatic aldehydes in the presence of free radical initiators.

SUMMARY OF THE INVENTION

The present invention relates to a process for preparing acylsuccinic acid polyesters by reacting A) a polyester, which is the reaction product of
  i) maleic acid, maleic acid esters, maleic anhydride, fumaric acid and/or fumaric acid esters and optionally other diacids, monoacids or their derivatives with
  ii) diols and optionally monofunctional alcohols,
  wherein the molar ratio of diols to diacids and their derivatives is 0.667:1 to 1.5:1, and the molar ratio of maleic acid and its derivatives+fumaric acid and its derivatives to other diacids and their derivatives is greater than 0.15:1, and the molar ratio of monofunctional compounds to difunctional compounds is less than 0.4:1, with B) aliphatic $C_2$–$C_{22}$ aldehydes and/or cycloaliphatic $C_6$–$C_{20}$ aldehydes, in the presence of 0.2 to 10% by weight (based on the weight of polyester) of free radical initiators at a temperature of 60 to 160° C. and a pressure of 1 to 20 bar wherein the molar ratio of aldehydes to maleic acid ester and fumaric acid ester units is 1:1 to 50:1, and distilling off excess aldehyde.

The present invention also relates to the acylsuccinic acid polyesters prepared by this process and to their use for the production of thermosetting plastics by reaction with di- or polyisocyanates such that 0.5 to 2 equivalents of isocyanate groups are used for each equivalent of acylsuccinic acid ester units.

DETAILED DESCRIPTION OF THE INVENTION

The acylsuccinic acid polyesters are obtained by the reaction of

A) a polyester, which is the reaction product of
  i) maleic acid, maleic acid esters, maleic anhydride, fumaric acid and/or fumaric acid esters and optionally other diacids, other diacid esters, other cyclic anhydrides, monocarboxylic acids, monocarboxylic acid esters and/or monocarboxylic anhydrides,
  ii) with diols and optionally monofunctional alcohols,
  wherein the molar ratio of diols to diacid derivatives is 0.667:1 to 1.5:1, and the molar ratio of maleic acid derivatives+fumaric acid derivatives to other diacid derivatives is greater than 0.15:1, preferably greater than 5:1, and the molar ratio of monofunctional compounds to difunctional compounds is less than 0.4:1, preferably less than 0.1:1, with B) aliphatic $C_2$–$C_{22}$ aldehydes, preferably $C_4$–$C_8$ aldehydes and/or cycloaliphatic $C_6$–$C_{20}$ aldehydes, preferably $C_6$–$C_7$ aldehydes, in the presence of 0.2 to 10% by weight (based on the weight of polyester) of free radical initiators at a temperature of 60 to 160° C. and a pressure of 1 to 20 bar wherein the molar ratio of aldehydes to maleic acid ester and fumaric acid ester unit is 1:1 to 50:1, preferably 3:1 to 15:1. The products are isolated by distilling off the excess aldehydes, or the solvents which are optionally present, at pressures of 0.0001 to 1 bar, preferably 0.001 to 1 bar.

The alcohol component of the maleic acid esters, the fumaric acid esters, the other dicarboxylic acid esters or the monocarboxylic acid esters are preferably aliphatic $C_1$–$C_6$ alcohols, more preferably methanol, ethanol, the isomeric propanols or the isomeric butanols.

Examples of other dicarboxylic acids or dicarboxylic acid derivatives (esters, anhydrides, etc.) which are used according to the invention include phthalic acid, isophthalic acid, terephthalic acid, tetrahydrophthalic acid, 1,2-, 1,3- or 1,4-cyclohexane-dicarboxylic acid, adipic acid, glutaric acid, succinic acid, oxalic acid, sebacic acid, azelaic acid, dimeric fatty acids, hydrogenated dimeric fatty acids, diesters of the preceding acids, preferably with aliphatic $C_1$–$C_6$ alcohols, and the internal anhydrides of those acids capable of forming internal anhydrides.

Examples of monocarboxylic acids or monocarboxylic acid derivatives include benzoic acid, tertiary butylbenzoic acid, oleic acid, linoleic acid, linolenic acid, stearic acid, palmitic acid, undecanoic acid, undecenoic acid, 2-ethylhexanoic acid, caproic acid, abietic acid, hydrogenated abietic acid, esters of these acids, preferably with aliphatic $C_1$–$C_6$ alcohols, and anhydrides of these acids.

Suitable diols include ethylene glycol, 1,2- or 1,3-propylene glycol, 1,2- or 1,4-butanediol, neopentyl glycol, adipol, 1,4-cyclohexane-dimethanol and 2,2-bis(4-hydroxyethoxyphenyl)propane.

Monofunctional alcohols include hexanol, cyclohexanol, benzyl alcohol, trimethylolpropane diallyl ether, glycerol diallyl ether, stearyl alcohol, hydroxyethoxybenzene, oleyl alcohol, undecanol and undecenol.

Examples of aliphatic aldehydes include acetaldehyde, propionaldehyde, butyraldehyde, isobutyraldehyde, hexanal, 2-ethylhexanal and undecanal. Examples of cycloaliphatic aldehydes include cyclohexyl aldehyde or cyclopentyl aldehyde.

Organic peroxides or azo compounds are used as the free radical initiators according to the invention, e.g., the compounds described in Peroxid-Chemie GmbH Information Document A3.7.1: Organic Peroxides. Benzoyl peroxide is preferably used.

The esterification reaction which is used to prepare the unsaturated polyesters may be conducted in the presence of known transesterification catalysts, such as organotin compounds or titanium compounds, at temperatures of 130 to 240° C., optionally in the presence of substances which form azeotropes with water, such as xylene, mesitylene, chlorobenzene or o-dichlorobenzene. Inert conditions are preferably maintained during the esterification reaction by the use of nitrogen. 0.001 to 0.5% by weight, based on the weight of the reactants, of inhibitors such as hydroquinone (or derivatives thereof), sterically hindered phenols or sulphur may optionally be added.

The subsequent reaction of the unsaturated polyesters with aldehydes is preferably conducted in the presence of 0.5 to 5% by weight of free radical initiators, preferably benzoyl peroxide, at 80 to 90° C. Normal pressure is employed if the boiling point of the aldehyde is above 80° C. If the boiling point of the aldehyde is less than 80° C., the reaction system's own pressure is employed, optionally plus an external pressure of 2 to 10 bar using an inert gas such as nitrogen. The reaction is conducted over a period of 10 to 30 hours.

The acylsuccinic acid polyesters according to the invention may be used for the production of thermosetting plastics by a reaction with di- or polyisocyanates. The amounts of the reactants are selected such that 0.5 to 2, preferably 0.8 to 1.2 equivalents of isocyanate groups are present for each equivalent of acylsuccinic acid ester units. The reaction may be conducted in the presence or absence of aprotic solvents.

Examples of di- or polyisocyanates include 1,6-diisocyanato-hexane, 1,3-diisocyanato-4-methylcyclohexane, 1,3-diisocyanato-2-methylcyclohexane, 1,6-diisocyanato-3,3,5-trimethylhexane, 1,3- and 1,4-xylylene diisocyanate, 1,3-diisocyanatomethyl-4,6-dimethylbenzene, 1,3- and 1,4-diisocyanatomethyl-α,α,α',α'-tetramethylbenzene, bis(4-isocyanatocyclohexyl)-methane, bis(4-isocyanato-3methylcyclohexyl)-methane, bis(4-isocyanato-3-ethylcyclohexyl)-methane, dimeric fatty acid diisocyanate, toluene 2,4- and 2,6-diisocyanate, bis(4-isocyanatophenyl) methane, 1,3- and 1,4-diisocyanatobenzene. Also suitable are polyisocyanates containing isocyanurate groups, biuret groups or urethane groups (obtained from triols such as trimethylolpropane).

Production of the thermosetting plastics preferably takes place at 20 to 140° C., more preferably 50 to 120° C.

The thermosetting plastics are preferably used in sheet-like form as coatings for substrates, such as metals, wood, plastics, leather, textiles, concrete or other construction materials. These coatings are characterized by good flexibility and solvent resistance.

The invention is further illustrated but is not intended to be limited by the following examples in which all parts and percentages are by weight unless otherwise specified.

EXAMPLES

Example 1 (preparation of an unsaturated polyester)

A mixture containing 294 g of maleic anhydride (3 moles), 436 g of neopentyl glycol (4 moles), 0.5 g of hydroquinone and 0.2 g of dibutyltin dilaurate was heated at 200° C. under nitrogen for 16 hours while water was distilled off.

Example 2 (radical addition of hexanal)

50 g of the unsaturated polyester from Example 1 were dissolved in 200 ml of hexanal, 1 g of benzoyl peroxide was added and the mixture was heated to 85° C. The excess aldehyde was then removed under vacuum. 81 g of a polyester were obtained, which predominantly contained ester units of hexanoylsuccinic acid and neopentyl glycol.

Example 3 (radical addition of n-butanol)

500 g of the unsaturated polyester from Example 1 were dissolved in 2000 ml n-butyraldehyde, 10 g of benzoyl peroxide were added and the mixture was heated in an autoclave at 85° C. under its own pressure. The excess aldehyde was then removed under vacuum. 672 g of a polyester were obtained, which predominantly contained ester units of butanoylsuccinic acid and neopentyl glycol.

Example 4

3 g of the acylsuccinic acid polyester from Example 2 were dissolved in 3 ml of toluene and then 2 g of tris-isocyanatohexyl isocyanurate (Desmodur N 3300, available from Bayer AG) were added. A 100μ film was applied to a glass plate and stored for 30 minutes at 120° C. An acetone-resistant film was obtained.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. An acylsuccinic acid polyester which is prepared by
    (1) reacting
        A) a polyester, which is the reaction product of
            i) an acidic component comprising a member selected from the group consisting of a) maleic acid, maleic acid esters, maleic anhydrides, fumaric acid, fumaric acid esters, and mixtures thereof and b) mixtures of A(i)(a) and monoacids and/or other diacids; and
            ii) a hydroxyl-containing component comprising a member selected from the group consisting of a) diols and b)mixtures of A(ii)(a) and monofunctional alcohols, wherein the molar ratio of diol to the acidic component is 0.667:1 to 1.5:1 with
        B) an aliphatic $C_2$–$C_{22}$ aldehyde and/or a cycloaliphatic $C_6$–$C_{20}$ aldehyde, in the presence of 0.2 to 10% by weight (based on the weight of polyester) of a free radical initiator at a temperature of 60 to 160° C. and a pressure of 1 to 20 bar wherein the molar ratio of aldehyde to ester units is 1:1 to 50:1; the molar ratio of monofunctional compounds to difunctional compounds is less than 0.4:1 and
    (2) distilling off excess aldehyde.

2. The acylsuccinic acid polyester of claim 1, wherein the molar ratio of the acidic component to the other diacids is greater than 0.15:1.

3. The acylsuccinic acid polyester of claim 1 wherein the molar ratio of the acidic component to the other diacids is greater than 5:1 and the molar ratio of monofunctional compounds to difunctional compounds is less than 0.1:1.

4. The acylsuccinic acid polyester of claim 1, wherein the monoacids comprise a monoacid component selected from the group consisting of benzoic acid, tertiary butylbenzoic acid, oleic acid, linoleic acid, linolenic acid, stearic acid, palmitic acid, undecanoic acid, undecenoic acid, 2-ethylhexanoic acid, caproic acid, abietic acid, hydrogenated abietic acid, benzoic acid esters, tertiary butylbenzoic acid esters, oleic acid esters, linoleic acid esters, linolenic acid esters, stearic acid esters, palmitic acid esters, undecanoic acid esters, undecenoic acid esters, 2-ethylhexanoic acid esters, caproic acid esters, abietic acid esters, hydrogenated abietic acid esters, benzoic acid anhydrides, tertiary butylbenzoic acid anhydrides, oleic acid anhydrides, linoleic acid anhydrides, linolenic acid anhydrides, stearic acid anhydrides, palmitic acid anhydrides, undecanoic acid anhydrides, undecenoic acid anhydrides, 2-ethylhexanoic acid anhydrides, caproic acid anhydrides, abietic acid anhydrides and hydrogenated abietic acid anhydrides.

5. The acylsuccinic acid polyester of claim 1, wherein the other diacids comprise an acid component selected from the group consisting of phthalic acid, isophthalic acid, terephthalic acid, tetrahydrophthalic acid, 1,2- cyclohexanedicarboxylic acid, 1,3 cyclohexane-dicarboxylic acid, 1,4-cyclohexane-dicarboxylic acid, adipic acid, glutaric acid, succinic acid, oxalic acid, sebacic acid, azelaic acid, dimeric fatty acids, hydrogenated dimeric fatty acids, phthalic acid diesters, isophthalic acid diesters, terephthalic acid diesters, tetrahydrophthalic acid diesters, 1,2-cyclohexanedicarboxylic acid diesters, 1,3 cyclohexane-dicarboxylic acid diesters, 1,4-cyclohexane-dicarboxylic acid diesters, adipic acid diesters, glutaric acid diesters, succinic acid diesters, oxalic acid diesters, sebacic acid diesters, azelaic acid diesters, dimeric fatty acids diesters, and hydrogenated dimeric fatty acid diesters.

6. A process for preparing an acylsuccinic acid polyester which comprises
　A) a polyester, which is the reaction product of
　　i) an acidic component comprising a member selected from the group consisting of a) maleic acid, maleic acid esters, maleic anhydrides, fumaric acid, fumaric acid esters, and mixtures thereof; and b) a mixture of A(i)(a) and monoacids and/or other diacids; and
　　ii) a hydroxyl-containing component comprising a member selected from the group consisting of a) diols and b) mixtures of A(ii) and monofunctional alcohols, wherein the molar ratio of diol to the acidic component is 0.667:1 to 1.5:1 with
　B) an aliphatic $C_2$–$C_{22}$ aldehyde and/or a cycloaliphatic $C_6$–$C_{20}$ aldehyde, in the presence of 0.2 to 10% by weight (based on the weight of polyester) of a free radical initiator at a temperature of 60 to 160° C. and a pressure of 1 to 20 bar wherein the molar ratio of aldehyde to ester units is 1:1 to 50:1; the molar ratio of monofunctional compounds to difunctional compounds is less than 0.4:1 and
　(2) distilling off excess aldehyde.

7. The process of claim 6, wherein the molar ratio of the acidic component to the other diacids is greater than 0.15:1.

8. The process of claim 6, wherein the molar ratio of the acidic component to the other diacids is greater than 5:1 and the molar ratio of monofunctional compounds to difunctional compounds is less than 0.1:1.

9. The process of claim 6, wherein the monoacids comprise a monoacid component selected from the group consisting of benzoic acid, tertiary butylbenzoic acid, oleic acid, linoleic acid, linolenic acid, stearic acid, palmitic acid, undecanoic acid, undecenoic acid, 2-ethylhexanoic acid, caproic acid, abietic acid, hydrogenated abietic acid, benzoic acid esters, tertiary butylbenzoic acid esters, oleic acid esters, linoleic acid esters, linolenic acid esters, stearic acid esters, palmitic acid esters, undecanoic acid esters, undecenoic acid esters, 2-ethylhexanoic acid esters, caproic acid esters, abietic acid esters, hydrogenated abietic acid esters, benzoic acid anhydrides, tertiary butylbenzoic acid anhydrides, oleic acid anhydrides, linoleic acid anhydrides, linolenic acid anhydrides, stearic acid anhydrides, palmitic acid anhydrides, undecanoic acid anhydrides, undecenoic acid anhydrides, 2-ethylhexanoic acid anhydrides, caproic acid anhydrides, abietic acid anhydrides and hydrogenated abietic acid anhydrides.

10. The process of claim 6, wherein the other diacids comprise an acid component selected from the group consisting of phthalic acid, isophthalic acid, terephthalic acid, tetrahydrophthalic acid, 1,2- cyclohexane-dicarboxylic acid, 1,3 cyclohexane-dicarboxylic acid, 1,4-cyclohexane-dicarboxylic acid, adipic acid, glutaric acid, succinic acid, oxalic acid, sebacic acid, azelaic acid, dimeric fatty acids, hydrogenated dimeric fatty acids, phthalic acid diesters, isophthalic acid diesters, terephthalic acid diesters, tetrahydrophthalic acid diesters, 1,2-cyclohexane-dicarboxylic acid diesters, 1,3 cyclohexane-dicarboxylic acid diesters, 1,4cyclohexane-dicarboxylic acid diesters, adipic acid diesters, glutaric acid diesters, succinic acid diesters, oxalic acid diesters, sebacic acid diesters, azelaic acid diesters, dimeric fatty acids diesters, and hydrogenated dimeric fatty acid diesters.

11. A composition containing the acylsuccinic acid polyester of claim 1 and a di- or polyisocyanate, which are present in amounts sufficient to provide 0.5 to 2 equivalents of isocyanate groups for each equivalent of acylsuccinic acid ester units.

12. A composition containing the acylsuccinic acid polyester of claim 2 and a di- or polyisocyanate, which are present in amounts sufficient to provide 0.5 to 2 equivalents of isocyanate groups for each equivalent of acylsuccinic acid ester units.

* * * * *